(12) United States Patent
Oddie et al.

(10) Patent No.: US 6,854,341 B2
(45) Date of Patent: Feb. 15, 2005

(54) FLOW CHARACTERISTIC MEASURING APPARATUS AND METHOD

(75) Inventors: Gary Martin Oddie, St. Neots (GB); Kenneth E. Stephenson, Newtown, CT (US); John Barry Fitzgerald, Cambridge (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 47 days.

(21) Appl. No.: 10/317,928

(22) Filed: Dec. 12, 2002

(65) Prior Publication Data

US 2003/0164049 A1 Sep. 4, 2003

(30) Foreign Application Priority Data

Dec. 14, 2001 (GB) .............................................. 0130050

(51) Int. Cl.⁷ .................................................. G01F 1/37
(52) U.S. Cl. ..................................................... 73/861.52
(58) Field of Search ........................ 73/861.04, 861.52, 73/861.02, 861.61, 861.63

(56) References Cited

U.S. PATENT DOCUMENTS

| | | | | |
|---|---|---|---|---|
| 4,562,744 A | * | 1/1986 | Hall et al. ................ | 73/861.02 |
| 4,903,649 A | | 2/1990 | Staerzl | |
| 5,501,099 A | * | 3/1996 | Whorff ....................... | 73/29.01 |
| 6,343,511 B1 | * | 2/2002 | Lynnworth et al. ........... | 73/644 |
| 6,622,574 B2 | * | 9/2003 | Fincke ..................... | 73/861.63 |

FOREIGN PATENT DOCUMENTS

| | | |
|---|---|---|
| GB | 2 376 530 | 3/2001 |
| WO | 85/02970 | 1/1985 |
| WO | 00/68652 | 5/2000 |
| WO | 01/77485 | 3/2001 |

OTHER PUBLICATIONS

Baker Industrial designs, operating principles, performance, and applicaions Chapter 5, Cambridge University Press, 2000, pp. 95–129.
Baker Industrial designs, operating principles, performance, and applicaions Chapter 6, Cambridge University Press, 2000, pp. 130–139.
Baker Industrial designs, operating principles, performance, and applicaions Chapter 8, Cambridge University Press, 2000, pp. 153–181.

(List continued on next page.)

*Primary Examiner*—Edward Lefkowitz
*Assistant Examiner*—Jewel V. Thompson
(74) *Attorney, Agent, or Firm*—William L. Wang; Tim Curington; William B. Batzer

(57) ABSTRACT

A differential pressure flow rate measurement apparatus comprises:

a conduit having a flow passage for conveying a fluid flow, the conduit being adapted for connection to a downhole fluid flow line having a bore of predetermined transverse cross-sectional area;

a flow energy dissipator which partially obstructs the flow passage and which is capable of imparting an angular velocity to the fluid flow and thereby causing a dissipative pressure drop in the fluid; and a pressure sensor for measuring said pressure drop.

The flow passage, when viewed in the axial direction of the flow passage, projects an unobstructed transverse cross-sectional area which is at least 25% of the transverse cross-sectional area of said bore.

18 Claims, 2 Drawing Sheets

OTHER PUBLICATIONS

Chiu et al Head loss in spiral solid–liquid flow in pipes Advances in solid–liquid flow in pipes and its application, Zandi (ed.), Pergamon Press, 1971, pp. 227–235.

Miller D S Internal flow systems Chapter 8, BHRA Fluid Engineering, 1978, pp. 129–139.

Miller R W Flow measurement engineering handbook Chapter 5, McGraw–Hill, 1983, pp. 5.1–5.68.

Nikuradse Forschungsheft 361, Stromungsgesetze in rauhen Rohren VDI–Verlag G.M.B.H, Berlin NW7, 1933, pp. 1–22.

Saniel et al Effect of height and geometry on local heat transfer and pressure drop in a channel with corrugated walls Heat Transfer Engineering, vol. 14, No. 4, 1993, pp. 19–31.

Wantanabe Transport of solids by pipeline with spiral tube ASME, 1995, FED–vol. 234, pp. 57–64.

Zarnett et al Concurrent gas–liqquid flow in horizontal tubes with internal spiral ribs Candian Journal of Chemical Engineering, vol. 47, Jun. 1969, pp. 238–241.

* cited by examiner

FLOW CHARACTERISTIC MEASURING APPARATUS AND METHOD

FIELD OF THE INVENTION

The present invention relates to an apparatus and method for the determination of one or more characteristics of a flowing fluid. In particular, the present invention is concerned with the determination of the flow rate of a flowing fluid, such as a fluid which may be encountered in hydrocarbon well boreholes.

BACKGROUND OF THE INVENTION

Knowledge of the flow rate of fluid in hydrocarbon well boreholes is important for monitoring and controlling fluid movement in the well and reservoir. Typically, in such hydrocarbon wells, the fluid flowing along the borehole includes a hydrocarbon (e.g. oil) and water. Each zone of the reservoir may have a valve to control the fluid inlet from that zone. By monitoring the flow rates of oil and water coming from each zone, the flow rate of oil can be optimised by control of the valves. In this way, the water cut may be minimised for example.

A flow meter installed in piping in a hydrocarbon well borehole should be able to operate relatively maintenance-free, due to the remoteness of its location. The flow meter should be able to cope with non-mixed and mixed flow regimes over a wide range of total flow rate and cut. Furthermore, the flow meter should not be sensitive to its orientation.

In non-mixed flow (such as stratified flow) the oil phase velocity and the water velocity are usually different. The difference in velocity is the phase slip. The volume fraction of water (holdup) must be measured in order to determine the flow rate of water, and similarly for the flow rate of oil. Thus, the determination of flow rate for a two-phase flow can be significantly more complex than for a single phase flow, and usually attempts are made to mix the flow before flow rate measurements are taken.

It is also often necessary to monitor or analyse the formation rock and the condition of piping and other components within the borehole. Measurements for this determination are usually taken by passing data logging tools along the pipeline. Such tools are dimensioned to pass along standard pipe sizes. Thus a flow meter for use downhole should be adapted to allow the unobstructed passage of logging tools.

It is known that flow rates can be measured on the basis of differential pressures in a flowing fluid. Differential pressure flow meters essentially fall into one of two types. The first type uses an inserted element of a design usually conforming to certain flow metering standards. The second type typically uses a piping element which dissipates energy from the flow and thereby leads to a pressure loss.

The first type of differential pressure flow meter includes devices which utilise e.g. orifice plates, Venturis, nozzles and Dall tubes, and rely on the conversion of pressure to kinetic energy in the fluid. In these flow meters, the equation for the differential pressure between two pressure measurement points (tappings) is given by $$\Delta P = f G \varepsilon \rho \frac{V^2}{2} \qquad (1)$$

In Equation (1), f is a term related to the way the fluid moves through the device, G is a dimensionless term related to the geometry of the device, $\varepsilon$ is the expansibility of the fluid (approximately unity for liquids), $\rho$ is the density of the fluid, and V is the velocity of the fluid defined at some point in the device (e.g. at an inlet or throat). This is usually rearranged to the more familiar differential pressure flow meter equation:

$$Q_m = CE\varepsilon\left(\frac{\pi}{4}\right)d^2\sqrt{2\rho\Delta P} \qquad (2)$$

In Equation (2), $Q_m$ is the mass flow rate, C is the discharge coefficient, E is a geometric term and d is the diameter of the throat or narrowest part of the flow.

Practical embodiments of Venturi-type flow meters for use in hydrocarbon well situations are given in WO00/68652.

The second type of differential pressure flow meter utilises the dissipative pressure drop created by elements of a piping system (such as elbows) to measure the flow rate. In devices of this second type, the pressure drop is given by an equation of the form shown in Equation (1) above with the various geometric and loss coefficients determined by experiments. For example, the pressure drop generated by an incompressible liquid flowing down a rough pipe is given by:

$$\Delta P = f \frac{L}{D} \rho \frac{V^2}{2} \qquad (3)$$

In Equation (3), L is the length of the pipe and D is the diameter of the pipe. f is the friction coefficient and can be calculated from the Colebrook-White equation (D. S. Miller, "Internal flow systems" Chapter 8, BHRA, 1978):

$$f = \frac{0.25}{\left[\log_{10}\left(\frac{k}{3.7D} + \frac{5.74}{Re^{0.9}}\right)\right]^2} \qquad (4)$$

In Equation (4) k is the pipe roughness (having the same units as D) and Re is the Reynolds number defined as:

$$Re = \frac{\rho V D}{\eta} \qquad (5)$$

where $\eta$ is the viscosity of the flowing fluid.

Although geometrically similar devices might be expected to have the same friction coefficient, flow phenomena may occur which do not scale with Equation (3). Therefore, rather than applying a scaling equation, it is generally considered advisable to calibrate such meters separately.

A disadvantage of devices of both the first and second type is the sensitivity of such devices to the inlet flow conditions, such as swirl or pulsation. Also, particularly in respect of the second type, where the losses are due to sharp edges or surface roughness, corrosion and/or erosion can significantly affect the geometric and loss coefficients, and thereby impact on the accuracy of the predicted flow rates.

Thus flow meters of this second type are usually only used where there is no possibility of incorporating "classical" flow meters of the first type such as Venturi flow meters.

For example flow meters of the second type may be used in very hostile or non-serviceable environments such as nuclear reactors, where the only feasible additions to the pipe work are pressure tappings for measurement of the differential pressure.

An alternative approach for measuring flow rate is based on the deliberate introduction of a swirl into the flow. The flow rate may then be determined by various means.

One option is to accelerate the swirl through a nozzle. Perturbations in the inlet flow (e.g. turbulent fluctuations) then become large amplitude pressure pulsations which can be detected and related to the flow rate. This principle is known as the "vortex whistle" and the rate of precession of the vortex is proportional to the flow rate.

A second option is to insert a vane or turbine in the swirling flow which is attached to a strain gauge or torque meter and is designed to detect only the force generated by the swirl which is again proportional to the flow rate.

In both cases, however, the "swirler" is very invasive to the flow. It is usually necessary to place a second flow conditioner downstream of the meter to straighten the flow.

Zarnett and Charles (G. D. Zarnett and M. E. Charles, Can. J. Chem. Eng., Vol. 47, (1969), 238–241) provide results from a laboratory study of air-liquid flows through a transparent plastic tube fitted with internal spiral ribs. The purpose of the study was to correlate flow patterns with pressure gradients. They did not suggest using the tube as a flow meter, and indeed such use would have been difficult to conceive of due to the difficulty of properly mixing the air-liquid flows.

SUMMARY OF THE INVENTION

An object of the present invention is to provide a means for overcoming or avoiding-one, some or all of the disadvantages of known flow meter devices identified above.

In general terms, the present invention provides a flow characteristic measurement device which is capable of measuring a pressure drop in a fluid flow caused by dissipation of the energy of the fluid flow by the device. Preferably the device is adapted for use downhole in a hydrocarbon well.

Accordingly, in a first aspect, the present invention provides a differential pressure flow rate measurement apparatus comprising:
  a conduit having a flow passage for conveying a fluid flow, said conduit being adapted for connection to a downhole fluid flow line having a bore of predetermined transverse cross-sectional area;
  a flow energy dissipator which partially obstructs said flow passage and which is capable of imparting an angular velocity to the fluid flow and thereby causing a dissipative pressure drop in the fluid; and
  a pressure sensor for measuring said pressure drop,
  wherein said flow passage, when viewed in the axial direction of the flow passage, projects an unobstructed transverse cross-sectional area which is at least 25% of the transverse cross-sectional area of said bore.

The imparted angular velocity typically produces a swirl in the flow. This causes a dissipative loss of energy from the fluid, which manifests itself as a measurable pressure drop in the flowing fluid.

An advantage of such a flow energy dissipator is that angular velocity can be imparted to the fluid without using sharp edges or roughness. Thus the flow energy dissipator is not so susceptible to erosion or corrosion as some prior art devices.

The provision of an unobstructed transverse cross-sectional area of such a size through the flow passage means that the apparatus can be adapted so that data logging equipment can pass along the flow line and through the flow passage substantially unimpeded.

The conduit may be used for conveying a flowing fluid of at least two phases, such as oil and water. In that case, the flow energy dissipator is preferably capable of substantially equalising the flow velocities of the two phases. Advantageously, the apparatus is thereby capable of substantially mixing said at least two phases.

In a second aspect, the present invention provides a differential pressure flow rate measurement apparatus comprising:
  a conduit having a flow passage for conveying a fluid flow of at least two phases, said conduit being adapted for connection to a downhole fluid flow line having a bore of predetermined transverse cross-sectional area;
  a flow energy dissipator which partially obstructs said flow passage and, in use, causes a dissipative pressure drop in the fluid, and which is capable of substantially equalising the flow velocities of the two phases; and
  a pressure sensor for measuring said pressure drop,
  wherein said flow passage, when viewed in the axial direction of the flow passage, projects an unobstructed transverse cross-sectional area which is at least 25% of the transverse cross-sectional area of said bore.

The unobstructed transverse cross-sectional area provides the same advantage with respect to the passage of data logging equipment as described with respect to the first aspect, above.

The following optional features are applicable to either or both of the first and the second aspects of the invention.

Preferably, the unobstructed transverse cross-sectional area of the flow passage advantageously is at least 40%, 50% 60%, 70%, 80%, 90% or 100% of the transverse cross-sectional area of said bore. In general, the larger the unobstructed area, the greater the allowable transverse dimension of data logging equipment which an operator can pass along the flow line and through the flow passage.

An operator may use e.g. a "look up table" to convert a pressure drop measurement measured by the pressure sensor into a flow rate. Preferably, however, the apparatus further comprises a processor for converting the pressure drop measured by the pressure sensor into a flow rate. In this way the operator can be provided directly with a flow rate. The processor may be a dedicated device which, in use, may be located downhole or at the surface. Alternatively, however, it may be an appropriately programmed computer.

Because the conduit is intended for downhole use, it should be formed of a sufficiently strong, wear resistant, tough etc. material to withstand this environment. It may be formed of steel, for example, but the skilled person would be aware of other suitable materials.

Typically, the flow energy dissipator extends a distance along the flow passage. Furthermore, typically the pressure drop is measured between first location and second locations in the conduit which are spaced in the direction of fluid flow. Preferably, the first location is then downstream of the upstream extremity of the flow energy dissipator. This can be advantageous because the fluid flow can then be conditioned (e.g. to remove pulsations) by the upstream part of the flow energy dissipator before the pressure at the first location is measured. Furthermore, the second location is preferably upstream of the downstream extremity of the flow energy dissipator to avoid flow disturbances caused by the flow transition out of the dissipator.

Typically, the flow line (which is e.g. formed of pipe sections) to which the apparatus is adapted to fit has a bore of circular section. Furthermore, preferably the overall and/or the unobstructed transverse cross-sectional areas of the flow passage are circular. It is desirable for the unobstructed transverse cross-sectional area to be located substantially centrally in the flow passage (i.e. for the flow energy dissipator to be provided at the wall of the flow passage) as this aids passage of a logging tool.

In one embodiment, the flow energy dissipator is an insert fitted to the conduit e.g. at the wall of the flow passage. The insert may then be pre-shaped, independently of the conduit. Alternatively, the flow energy dissipator may be formed integrally with the wall of the flow passage, for example by machining the inner wall of the flow passage to form a ridge or projection.

In a preferred embodiment, the flow energy dissipator is a substantially helical or spiral shaped element which winds along the wall of the flow passage. Such an element imparts an angular velocity to the fluid flow. If we define D as the overall diameter of a circular transverse cross-section flow passage and d as the thickness of the helical element winding (i.e. the distance the element projects from the wall of the flow passage), the unobstructed (circular) transverse cross-sectional area of the flow passage then has a diameter, D', equal to D−2d. Preferably, d/D' is in the range 0.05 to 0.25 (more preferably 0.1 to 0.2). If we define P as the pitch of the helical element, preferably P/D' is in the range 0.5 to 2 (more preferably 0.75 to 1.5). A pitch equal to about D' appears to provide useful pressure drops and significant mixing.

The helical element preferably has at least five (more preferably at least 10, 20 or 30) turns. The element may have a varying pitch along its length. Preferably, the element has increasing pitch in an upstream direction in the conduit. Additionally or alternatively, the element may reverse its winding sense at at least one point along its length. These optional features can individually or in combination increase the fluid pressure loss due to the element. In particular, reversal of the winding sense can be helpful if the helical element has about 20 or more turns, as this promotes flow efficiency and linearity.

We have found that a surprising advantage of the helical flow energy dissipator is that it can provide good mixing of the phases in a multiphase flow, particularly in a water-oil flow. This is of considerable benefit since the determination of the flow rate in multi-phase flows is significantly less complex where good mixing of the phases is achieved. We believe the mixing is promoted by the angular flow velocity imposed by the helical windings.

A further advantage of the helical flow energy dissipator is that the pressure drop which it produces for a given flow rate is proportional to its length. Thus the sensitivity of the measurement apparatus can be readily increased merely by lengthening the helical element. This is in contrast to e.g. a Venturi meter in which a larger pressure drop is typically produced by reducing the throat diameter. In hydrocarbon well applications this is significant because the reduced throat diameter of a Venturi meter could impede the passage of logging equipment, whereas increasing the length of the helical element should not.

We have also found that, to a significant extent, the helical element is "self-cleaning". That is the shape of the element and the swirl which it promotes tend to discourage debris from settling on the element. This debris might otherwise reduce the size of the unobstructed transverse cross-sectional arae of the flow passage and affect the friction coefficient of the element.

An alternative flow energy dissipator for imparting an angular velocity to the fluid flow comprises a series of angled vanes formed on the inner wall of the flow passage. However, the helical element has the practical advantage of being easily pre-shaped and installed in the flow passage of the conduit.

The apparatus may further comprise a holdup calculator for determining a volume fraction of a first fluid phase in the flowing fluid, the holdup calculator preferably being located downstream of the flow energy dissipator. The holdup calculator may include a densitometer, such as a gamma ray densitometer. Preferably, the location of the holdup calculator is such that the phases of a multi-phase fluid are substantially completely mixed by the flow energy dissipator at that location.

In a further aspect, the present invention provides for the use, for measuring the flow rate of a fluid, of the differential pressure flow rate measurement apparatus of either of the previous aspects of the invention. Preferably the apparatus is used downhole in a hydrocarbon well.

However, this does not exclude the possibility that a differential pressure flow rate measurement apparatus according to the present invention may be used on the surface.

Consequently a further aspect of the present invention provides a differential pressure flow rate measurement apparatus comprising:

a conduit having a flow passage for conveying a fluid flow, said conduit being adapted for connection to a fluid flow line having a bore of predetermined transverse cross-sectional area;

a flow energy dissipator which partially obstructs said flow passage and which is capable of imparting an angular velocity to the fluid flow and thereby causing a dissipative pressure drop in the fluid;

a pressure sensor for measuring said pressure drop; and a processor for converting the pressure drop measured by the pressure sensor into a flow rate, wherein said flow passage, when viewed in the axial direction of the flow passage, projects an unobstructed transverse cross-sectional area which is at least 25% of the transverse cross-sectional area of said bore.

And a still further aspect of the present invention provides a differential pressure flow rate measurement apparatus comprising:

a conduit having a flow passage for conveying a fluid flow of at least two phases, said conduit being adapted for connection to a fluid flow line having a bore of predetermined transverse cross-sectional area;

a flow energy dissipator which partially obstructs said flow passage and, in use, causes a dissipative pressure drop in the fluid (e.g. by imparting an angular velocity to the fluid flow), and which is capable of substantially equalising the flow velocities of the two phases;

a pressure sensor for measuring said pressure drop; and a processor for converting the pressure drop measured by the pressure sensor into a flow rate, wherein said flow passage, when viewed in the axial direction of the flow passage, projects an unobstructed transverse cross-sectional area which is at least 25% of the transverse cross-sectional area of said bore.

Optional features of the first and second aspects of the invention are applicable to either or both of the two previous aspects.

In another aspect, the present invention provides a piping arrangement having a first pipe section with a first bore, a second pipe section with a second bore which has a transverse cross-sectional area which is equal to or smaller than that of the first bore, and an apparatus according to one of the previous aspects of the invention connected therebetween; wherein the flow passage projects an unobstructed transverse cross-sectional area, when viewed in the axial direction of the flow passage, of at least 25% of the transverse cross-sectional area of the second bore.

The piping arrangement may be downhole in a hydrocarbon well. Preferably, the piping arrangement is adapted for conveying hydrocarbons and/or mixtures of hydrocarbons and water.

The piping arrangement may further include a data logging tool which is capable of passing between the first and second pipe sections via the flow rate measurement apparatus.

In a further aspect, the present invention provides a downhole piping arrangement of a hydrocarbon well, the piping arrangement having a first pipe section with a first bore, a second pipe section with a second bore which has a transverse cross-sectional area which is equal to or smaller than that of the first bore, and a differential pressure flow rate measurement apparatus connected therebetween; wherein the differential pressure flow rate measurement apparatus comprises (i) a conduit having a flow passage which is partially obstructed by a flow energy dissipator, and (ii) a pressure sensor for measuring a pressure drop caused by the flow energy dissipator, the flow passage projecting an unobstructed transverse cross-sectional area, when viewed in the axial direction of the flow passage, of at least 25% of the transverse cross-sectional area of the second bore.

Preferably, the differential pressure flow rate measurement apparatus is an apparatus according to the first or second aspect of the invention.

The piping arrangement may further include a data logging tool which is capable of passing between the first and second pipe sections via the flow rate measurement apparatus.

BRIEF DESCRIPTION OF THE DRAWINGS

Preferred embodiments of the present invention will now be described, by way of example only, with reference to the accompanying drawings, in which.

DETAILED DESCRIPTION

Figure 1:
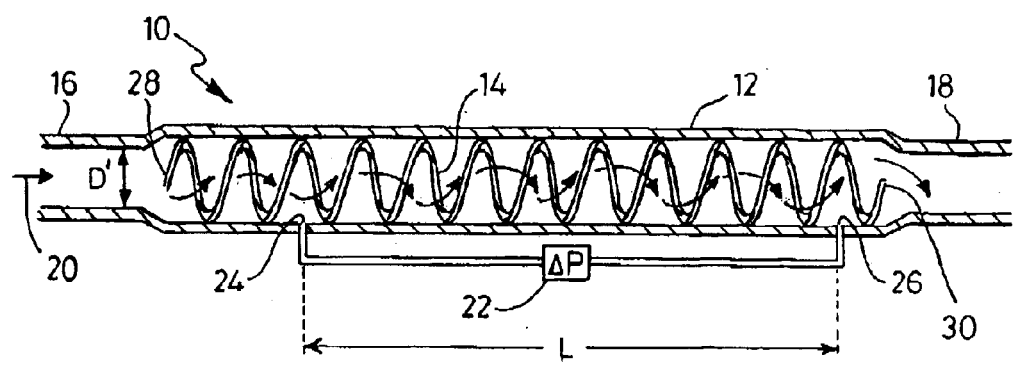
FIG. 1 is a schematic partial sectional view of a first embodiment of the invention.

FIG. 1 shows a differential pressure measurement apparatus 10 according to an embodiment of the present invention in use. The measurement apparatus 10 includes a metering pipe 12 with a helical insert 14. Metering pipe 12 is connected between an upstream pipe 16 and a downstream pipe 18. Arrow 20 indicates a fluid flow through the flow passage defined by the inner wall of metering pipe 12.

The helical insert 14 is fitted within the metering pipe so that it forms a snug fit with the inner wall of the metering pipe. The helical insert 14 extends for substantially the whole length of the metering pipe.

Differential pressure meter 22 measures a difference in pressure ΔP in the metering pipe between upstream pressure tapping point 24 and downstream pressure tapping point 26. Tapping points 24 and 26 are separated by an axial distance L along the length of the metering pipe 12. Tapping point 24 is downstream of the upstream extremity 28 of the helical insert 14. Tapping point 26 is upstream of the downstream extremity 30 of the helical insert 14.

Figures 2A, 2B:
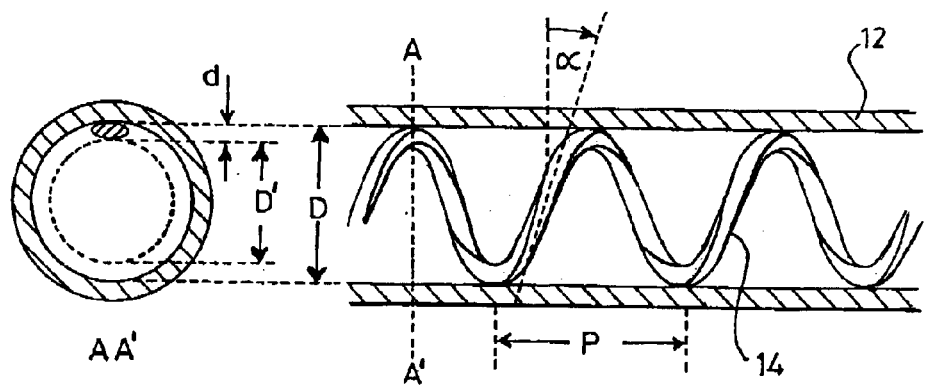
FIG. 2A is a schematic end-on view of section AA' in FIG. 2B, which in turn is an enlargement of a portion of the view shown in FIG. 1.

FIG. 2A is a schematic end-on view of section AA' in FIG. 2B, which in turn is an enlargement of a portion of the view shown in FIG. 1.

FIG. 2B illustrates the helical insert 14 more clearly than FIG. 1. The insert 14 is formed from stainless steel. Typically, it is formed by bending or twisting a stainless steel rod. The rod may have a rounded or angular (e.g. rectangular) cross-section. The helix formed has a steepness angle α which is the angle between a plane perpendicular to the principal axis of the helix and a line drawn through a point in the helix, parallel to a tangent to the helix. P is the pitch of the helix. i.e. the wavelength or the distance between two equivalent points on adjacent turns of the helix.

Helical insert 14 has an internal diameter D'. The thickness of the rod used to make the insert of the helical insert 14 is d. Since the helical insert fits against the internal wall of the metering pipe 12, the diameter of the metering pipe 12 is D'+2d=D.

P, D and α are related geometrically by:

$$\tan(\alpha) = \frac{P}{\pi D} \tag{6}$$

In this embodiment, the diameters of the upstream and downstream pipes 16, 18 are also D'. This is advantageous, as will be described later.

We have found that the size of the helix relative to the unobstructed area of the device, and the pitch of the helix are significant factors in determining the amount of mixing and dissipation. The cross-sectional shape of rod used to form the helix is of lesser significance in this respect.

If we consider the meter as a series of continuous stirred tank reactors (CSTRs), with each turn of the insert defining one CSTR of length P, the mixing in each CSTR is produced by that turn of the insert. A typical CSTR design criterion is to set the length of the reactor approximately equal to the diameter. Thus optimal mixing (which we might expect to coincide with optimal flow energy dissipation) can be expected when P=D'. Furthermore, as the flow passes over the insert there is boundary layer separation and flow reattachment to the main wall can be expected at about a distance d/(tan 7.5°) downstream (7.5° being the typical expansion angle of a free jet). For the next turn of the insert to have most effect, the reattachment point should coincide with the position of that turn.

Thus this simple fluid dynamic argument suggests that optimal mixing and flow energy dissipation (and hence pressure drop) will arise when P=D'=d/(tan 7.5°), which is close to what we have observed experimentally.

It is envisaged that apparatus 10 should be used in an oil well pipeline. In such circumstances, piping 16 and 18 transmit a flow of oil along with some water. There may also be other components present, such as gas or solid matter (e.g. drilling debris). The flow profile of the components in the pipe can be very complex. In particular, the volume flow rates of oil and water can be different if these two (immiscible) phases are not well mixed. For example, if the flow is stratified and one of the phases has a different velocity along the pipe compared to the other phase there may be phase slip at the stratification boundary.

Flow 20, on entering the metering pipe 12, encounters the helical insert 14. This imparts an angular velocity to the flow, gradually giving a spiralling or swirling flow as the flow proceeds along the metering pipe. A further consequence is that the phases in the flow, if not well mixed already, are mixed by the swirling flow.

The flow loses energy due to interaction with the helical insert. This dissipative energy loss causes a pressure drop in the fluid which gradually increases with distance along the length of the helical insert 14. The spiralling flow is indicated by curved arrows in FIG. 1.

Accordingly, the size of the pressure drop for a given flow rate depends on the distance between the pressure taps 24, 26 which can simply be increased by increasing the length of the helical insert 14. Thus the sensitivity of the meter can be readily adjusted without reducing D'.

In downhole hydrocarbon well situations this is a significant advantage. Generally there are relatively few constraints on a well operator in terms of inserting relatively long pipe sections of up to about 90 feet (the standard length of a drilling pipe is 30 or 31 feet, and a typical stand consists of three such lengths). On the other hand, the diameter of the well borehole and the need to allow for the passage of logging equipment imposes a severe constraint on the allowable transverse cross-sections of individual pipe sections. In practice, this means that the ultimate sensitivity which can be achieved with Venturi-type flow measurement devices is limited, whereas, the sensitivity of measurement apparatus 10 can be increased merely by lengthening the metering pipe.

The upstream pressure tap 24 is located in the metering pipe after at least a few turns of the helical insert. The reason for this is that the flow conditions may be changeable at the extreme upstream end 28 of the helix 14. Allowing several turns of the helix before the upstream pressure tap 24 helps to standardise the flow conditions sufficiently for repeatable differential pressure measurements to be taken.

Figure 3:
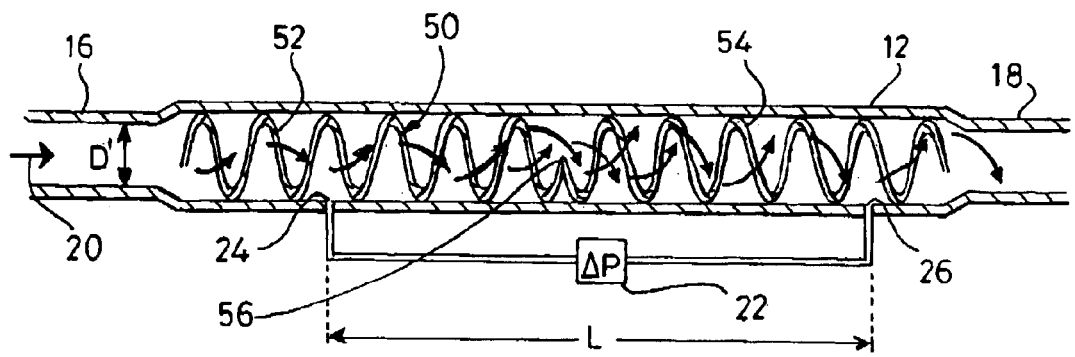
FIG. 3 is a schematic partial sectional view of a second embodiment of the invention.

FIG. 3 shows a second embodiment of the present invention. It is in many ways similar to the first embodiment, and so the same reference numbers are used for similar components, and they are not described again. However, a different form of insert 50 is located in the metering pipe 12. Insert 50 has two sections. The upstream section 52 is a helix with rotation in the anticlockwise sense along the flow direction. The downstream section 54 is a helix with rotation in the clockwise sense along the flow direction. The sense of rotation of the insert changes abruptly at section 56 of the insert. This is typically around halfway along the length of the insert.

The pressure drop associated with the second embodiment tends to be greater than the pressure drop associated with the first embodiment. This is due to the extra dissipative effect which the change in rotation sense of the helical insert has on the flow. As shown schematically in FIG. 3, the swirling flow is forced to change its direction of swirl at the midpoint of the metering pipe (in this case, at section 56).

In a further embodiment, the dissipative effect of the insert can be enhanced or altered by changing the pitch P (and angle α) of the helix along its length.

In general, it is not desirable to increase the dissipative effect per unit length of the insert by increasing d, although increasing d would increase the dissipative effect. This is because it is advantageous to maintain D' as close as possible to the internal diameter of the upstream and/or downstream piping to allow for the passage of logging equipment.

The effective bore of piping (particularly in heavy duty work like oil recovery) is often less than the nominal internal diameter of the piping. This is due to e.g. surface defects on the internal wall of the piping such as machining scars, scale, welding beads, curves in the pipe, corrosion and solid deposits. However, as long as the effective internal diameter of the helical insert (D') is the same or greater than this bore, then the metering apparatus may be considered "full bore" relative to the piping.

In some instance, and as can be seen in FIGS. 1 and 3, the metering pipe 12 may have a slightly larger outer diameter than that of the piping to which it is connected. This allows even higher values of D' to be achieved. However, the limit on this expansion is usually set by the diameter of the borehole in which the piping is located.

The helical insert has an impact on the deposition of solids from the flow to the internal wall of the metering pipe. For lower flow rates, the spiral flow tends to keep the solid matter in suspension, whereas at higher flow rates, the spiral flow of the solid particles tends to scour the internal wall of the metering pipe, reducing solid deposition. This "self-cleaning" effect increases the service reliability of the metering pipe.

For single phase liquid flows, the flow rate can be calculated (e.g. by a processor) from the measurement of ΔP and a reference value for the density of the liquid. For multiphase flows, the density is not necessarily constant since the volume fractions of the phases are not necessarily constant. In that case, the density must be measured. Typically, the density is measured where there is no slip between the phases, e.g. where they are well mixed. In the present embodiments, the density can be measured e.g. by a γ-ray densitometer (not shown) at a downstream location from the helical insert. A processor (also not shown) can then convert the ΔP and density measurements into a flow rate.

In the case of a multiphase flow of oil and water, the cut of water may also be calculated. The helical inserts 14, 50 are particularly efficient for mixing the phases of such a flow.

Figure 4:
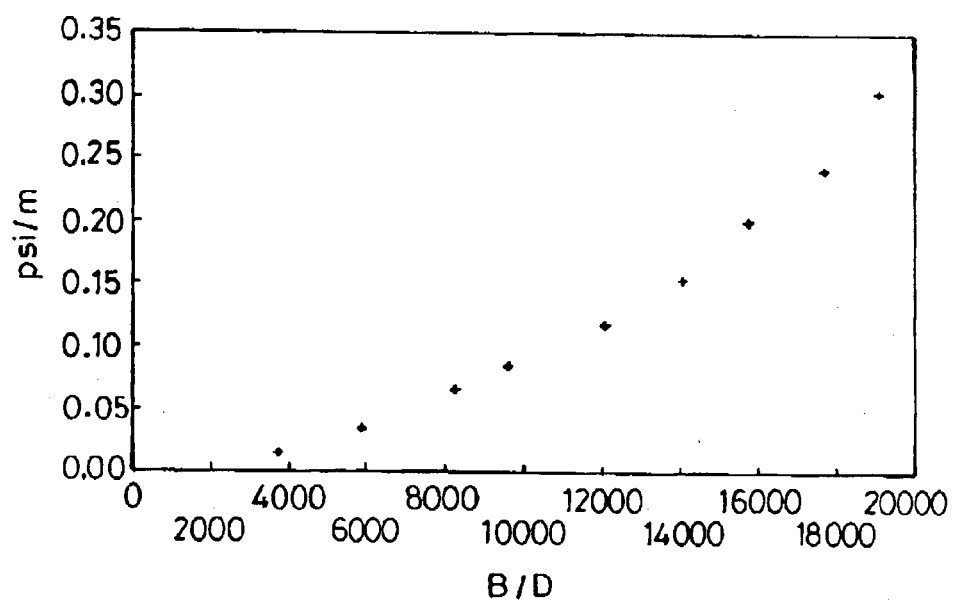
FIG. 4 is a graph illustrating the variation of pressure drop per meter of insert against flow rate for a further embodiment of the invention.

An example of a measurement apparatus has a metering pipe with diameter 6 inches (152 mm) and with a helical insert with d=0.75 (19 mm) inches and α=30°. The pressure loss calculated for such a measurement apparatus with flow rate is shown in FIG. 4. The pressure loss is given in psi per meter length of the helical insert. The flow rate is given in barrels per day. The data for this calculation was taken from C.-L. Chiu and J. J. Seman, "Head loss in a spiral solid-liquid flow in pipes" in "Advances in solid-liquid flow in pipes and its application" edited by I. Zandi, Pergamon 1971, paper 16 pages 227–235. This example shows that a helical insert with a distance between pressure taps of L=1.0 m will produce a pressure drop which is adequate for measurement purposes.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A differential pressure flow rate measurement apparatus comprising:
   a conduit having a flow passage for conveying a fluid flow, said conduit being adapted for connection to a downhole fluid flow line having a bore of predetermined transverse cross-sectional area;
   a flow energy dissipator which partially obstructs said flow passage and which is capable of imparting an angular velocity to the fluid flow and thereby causing a dissipative pressure drop in the fluid; and
   a pressure sensor for measuring said pressure drop between at least two points along the length of the flow energy dissipator,
   wherein said flow passage, when viewed in the axial direction of the flow passage, projects an unobstructed transverse cross-sectional area which is at least 25% of the transverse cross-sectional area of said bore.

2. A flow rate measurement apparatus according to claim 1 in which the conduit is for conveying a flowing fluid of at least two phases and wherein the flow energy dissipator is capable of substantially equalising the flow velocities of the two phases.

3. A piping arrangement having:
a first pipe section with a first bore,
a second pipe section with a second bore which has a transverse cross-sectional area which is equal to or smaller than that of the first bore, and
an apparatus according to claim 1 connected therebetween; wherein the flow passage projects an unobstructed transverse cross-sectional area, when viewed in the axial direction of the flow passage, of at least 25% of the transverse cross-sectional area of the second bore.

4. A piping arrangement according to claim 3, wherein the first pipe section, second pipe section and apparatus therebetween are adapted for use in hydrocarbon well.

5. A differential pressure flow rate measurement apparatus comprising:
a conduit having a flow passage for conveying a fluid flow of at least two phases, said conduit being adapted for connection to a downhole fluid flow line having a bore of predetermined transverse cross-sectional area;
a flow energy dissipator which partially obstructs said flow passage and, in use, causes a dissipative pressure drop in the fluid, and which is capable of substantially equalising the flow velocities of the two phases; and
a pressure sensor for measuring said pressure drop between at least two points along the length of the flow energy dissipator,
wherein said flow passage, when viewed in the axial direction of the flow passage, projects an unobstructed transverse cross-sectional area which is at least 25% of the transverse cross-sectional area of said bore.

6. A flow rate measurement apparatus according to claim 5, wherein the unobstructed transverse cross-sectional area of the flow passage is at least 40% of the transverse cross-sectional area of said bore.

7. A flow rate measurement apparatus according to claim 5, wherein the unobstructed transverse cross-sectional area of the flow passage is at least 50% of the transverse cross-sectional area of said bore.

8. A flow rate measurement apparatus according to claim 5, wherein the apparatus further comprises a processor for converting the pressure drop measured by the pressure sensor into a flow rate.

9. A flow rate measurement apparatus according to claim 5, wherein the pressure drop is measured between first and second locations which are respectively downstream of an upstream extremity of the flow energy dissipator and upstream of a downstream extremity of the flow energy dissipator.

10. A flow rate measurement apparatus according to claim 5, wherein the flow energy dissipator is an insert fitted to the conduit.

11. A flow rate measurement apparatus according to claim 5, wherein the flow energy dissipator is a substantially helical or spiral shaped element which winds along the wall of the flow passage.

12. A flow rate measurement apparatus according to claim 11, wherein the element reverses its winding sense at at least one point along its length.

13. A flow rate measurement apparatus according to claim 5, which further comprises a holdup calculator for determining a volume fraction of a first fluid phase in the flowing fluid, the holdup calculator being located downstream of the flow energy dissipator.

14. A flow rate measurement apparatus according to claim 13 wherein the holdup calculator includes a densitometer.

15. A flow rate measurement apparatus according to claim 5, wherein the overall transverse cross-section of the flow passage is circular.

16. A downhole piping arrangement of a hydrocarbon well, the piping arrangement having:
a first pipe section with a first bore,
a second pipe section with a second bore which has a transverse cross-sectional area which is equal to or smaller than that of the first bore, and
a differential pressure flow rate measurement apparatus connected therebetween;
wherein the differential pressure flow rate measurement apparatus comprises:
a conduit having a flow passage which is partially obstructed by a flow energy dissipator, and
a pressure sensor for measuring a pressure drop caused by the flow energy dissipator, between at least two points along the length of the flow energy dissipator;
the flow passage projecting an unobstructed transverse cross-sectional area, when viewed in the axial direction of the flow passage, of at least 25% of the transverse cross-sectional area of the second bore.

17. A differential pressure flow rate measurement apparatus comprising:
a conduit having a flow passage for conveying a fluid flow, said conduit being adapted for connection to a fluid flow line having a bore of predetermined transverse cross-sectional area;
a flow energy dissipator which partially obstructs said flow passage and which is capable of imparting an angular velocity to the fluid flow and thereby causing a dissipative pressure drop in the fluid;
a pressure sensor for measuring said pressure drop between at least two points along the length of the flow energy dissipator; and
a processor for converting the pressure drop measured by the pressure sensor into a flow rate,
wherein said flow passage, when viewed in the axial direction of the flow passage, projects an unobstructed transverse cross-sectional area which is at least 25% of the transverse cross-sectional area of said bore.

18. A differential pressure flow rate measurement apparatus comprising:
a conduit having a flow passage for conveying a fluid flow of at least two phases, said conduit being adapted for connection to a fluid flow line having a bore of predetermined transverse cross-sectional area;
a flow energy dissipator which partially obstructs said flow passage and, in use, causes a dissipative pressure drop in the fluid, and which is capable of substantially equalising the flow velocities of the two phases;
a pressure sensor for measuring said pressure drop between at least two points along the length of the flow energy dissipator; and
a processor for converting the pressure drop measured by the pressure sensor into a flow rate,
wherein said flow passage, when viewed in the axial direction of the flow passage, projects an unobstructed transverse cross-sectional area which is at least 25% of the transverse cross-sectional area of said bore.

* * * * *